United States Patent
Ryu et al.

(10) Patent No.: US 12,480,870 B2
(45) Date of Patent: Nov. 25, 2025

(54) NON-DISPERSIVE INFRARED GAS SENSOR USING GAS-PERMEABLE POLYMER OPTICAL WAVEGUIDE AND MANUFACTURING METHOD

(71) Applicant: ELECTRONICS AND TELECOMMUNICATIONS RESEARCH INSTITUTE, Daejeon (KR)

(72) Inventors: Jin Hwa Ryu, Daejeon (KR); Soocheol Kim, Daejeon (KR); Hyunseok Kim, Daejeon (KR); So Yung Park, Daejeon (KR); Hoe-Sung Yang, Daejeon (KR); Kang Bok Lee, Daejeon (KR); Kwang-Soo Cho, Daejeon (KR); Kyu Won Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 243 days.

(21) Appl. No.: 18/350,137

(22) Filed: Jul. 11, 2023

(65) Prior Publication Data
US 2024/0077417 A1    Mar. 7, 2024

(30) Foreign Application Priority Data

Sep. 6, 2022  (KR) .......... 10-2022-0112556

(51) Int. Cl.
*G01N 21/3504* (2014.01)
*G02B 6/42* (2006.01)

(52) U.S. Cl.
CPC ....... *G01N 21/3504* (2013.01); *G02B 6/4215* (2013.01); *G02B 6/4298* (2013.01); *G01N 2201/08* (2013.01)

(58) Field of Classification Search
CPC ... G01N 21/3504; G01N 21/031; G01N 21/61
See application file for complete search history.

(56) References Cited

U.S. PATENT DOCUMENTS 3,997,786 A * 12/1976 Lauer .................. G01N 24/008
                                                    250/343
7,335,885 B2 * 2/2008 Wong ...................... G01T 1/00
                                                    340/629
(Continued)

FOREIGN PATENT DOCUMENTS

GB    2262338 A * 6/1993 ......... G01N 21/3504
JP    2014174119 A   9/2014
(Continued)

OTHER PUBLICATIONS

A. Lamberti, et al., "PDMS membranes with tunable gas permeability for microfluidic applications", The Royal Society of Chemistry, pp. 61415-61419, Nov. 7, 2014.
(Continued)

*Primary Examiner* — Casey Bryant
(74) *Attorney, Agent, or Firm* — Rabin & Berdo, P.C.

(57) ABSTRACT

The disclosure relates to a non-dispersive infrared (NDIR) gas sensor which detects the concentration of gas with a simple structure and method by manufacturing an optical waveguide with a gas-permeable polymer material instead of a conventional cavity or chamber type. An optical signal travels through the optical waveguide of gas-permeable polymer by total internal reflection, and the gas naturally penetrates the optical waveguide without the use of separate inlet and outlet openings, so that the optical signal and gas particles come into contact with each other within the optical waveguide. Since the optical signal detected by a photodetector at the other end of the optical waveguide after traveling while contacting the gas particles has properties changed according to the concentration of the gas which (Continued)

they have contacted in the optical waveguide, it is possible to measure the concentration of a specific gas from the detected optical signal.

15 Claims, 4 Drawing Sheets

(56) References Cited

U.S. PATENT DOCUMENTS

| | | |
|---|---|---|
| 2007/0114412 A1 | 5/2007 | Wong |
| 2017/0370891 A1 | 12/2017 | Yoo |
| 2018/0045642 A1* | 2/2018 | Lin ..................... G01N 33/004 |
| 2019/0187135 A1 | 6/2019 | Kim et al. |

FOREIGN PATENT DOCUMENTS

| | | |
|---|---|---|
| KR | 20090091433 A | 8/2009 |
| KR | 10-2021-0034174 A | 3/2021 |
| KR | 20220079977 A | 6/2022 |

OTHER PUBLICATIONS

Ziliang Cai, et al., "A new fabrication method for all-PDMS waveguides", Sensors and Actuators A: Physical, pp. 44-47, Oct. 5, 2013.

* cited by examiner

[A-A' CROSS-SECTION VIEW]

NON-DISPERSIVE INFRARED GAS SENSOR USING GAS-PERMEABLE POLYMER OPTICAL WAVEGUIDE AND MANUFACTURING METHOD

BACKGROUND

1. Technical Field

The present disclosure relates to a non-dispersive infrared (NDIR) gas sensor, and more particularly, to an NDIR gas sensor using a gas-permeable polymer based optical waveguide.

2. Related Art

Gas is the most closely contacted object in the daily living environment, and is indispensable for the daily life of all living organisms, including not only humans but also animals and plants. Gases can be classified into beneficial and harmful gases according to their components, situations, objects, and the like. Therefore, gas monitoring needs to be managed basically and essentially for the safety of life.

Particularly, in a fire situation, gas sensors can directly affect the determination of life and property damage situations. It may not be an exaggeration to say that the final outcome of a fire is determined pursuant to the initial response. Therefore, research on gas sensors for initial response to a fire is being intensively conducted.

A fire caused by a combustion reaction in which a lot of light and heat is generated when a substance is combined with oxygen consists of the following sections.

Section 1 (First growth period): Combustion begins, a large amount of smoke, carbon dioxide (CO2), and carbon monoxide (CO) gases are generated, and the generated smoke, CO2, and CO gases increase in geometric progression.

Section 2 (Second growth period): A section during which flames occur, and combustion rapidly increases and reaches its peak.

Section 3 (Peak period): A section which has passed the maximum combustion section and during which the combustion gradually decreases in size before the flame is extinguished.

Section 4 (Attenuation period): A section during which combustion disappears after the extinction of the flame.

In case of a fire, smoke and gases having many components are generated, but basically carbon dioxide (CO2) and carbon monoxide (CO) gases are generated. Therefore, the detection of carbon dioxide and carbon monoxide gases in aforementioned Section 1 in fire occurrence can not only contribute decisively to the initial response to the fire, but also the detection of these gases, which are inevitably generated, can reduce the errors of 'non-fire alarm'.

Various studies are under progress on gas sensors such as semiconductor- or electrochemical-based contact types, non-dispersive infrared-based optical types, and the like. Among these, non-dispersive infrared (NDIR) gas sensors are rapidly emerging due to advantages such as long-term stability, high selectivity, accuracy, etc.

The NDIR gas sensor is based on a technology that measures gas concentration by using the characteristics that specific gas molecules absorb light of a specific wavelength. The NDIR gas sensor basically consists of a light source, a photodetector, and an optical cavity where gas molecules and optical signals come into contact with each other. The optical signal emitted from the light source travels in the optical cavity while contacting the gas molecules, and reaches the photodetector. At this time, the optical intensity of the optical signal which reaches the photodetector is inversely proportional to the concentration of the gas inside the optical cavity. That is, the higher the gas concentration in the optical cavity, the lower the intensity of the optical signal sensed by the photodetector. The relationship between the gas concentration and the optical signal intensity can be explained by Beer-Lambert (BL) theory as follows.

$$I = I_0 * \exp(-ACL) \tag{1}$$

where I denotes the amount of light detected by the photodetector, $I_0$ denotes the amount of light emitted from the light source (initial light intensity), A denotes the specific constant (i.e., light absorption of gas molecules), C denotes the concentration of gas molecules, and L denotes the length of the optical path. As shown in the above equation, when the initial light intensity $I_0$ and the light absorption A of gas molecules are constant, the final light intensity I can be expressed as a function of the gas molecule concentration C and the light path length L.

Figure 1:
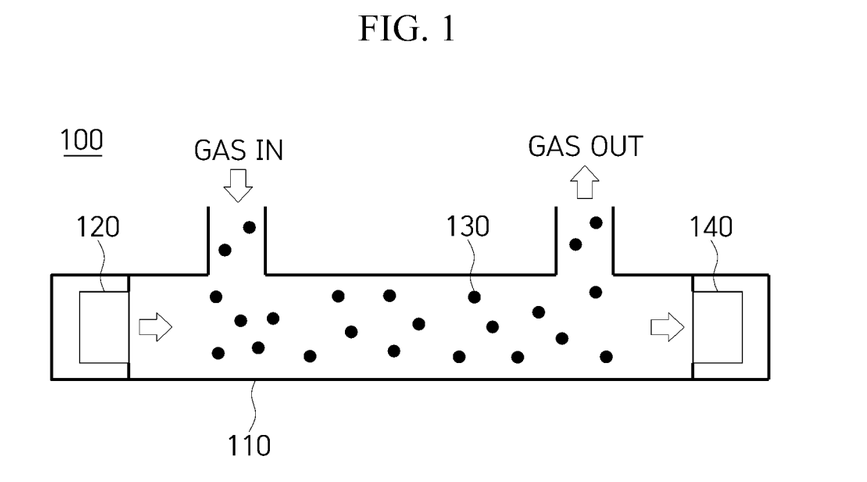
FIG. 1 is an exemplary configuration diagram of a conventional NDIR gas sensor.

Based on the Beer-Lambert theory, various studies have been conducted to improve the sensitivity of gas sensors. FIG. 1 shows the configuration of a type of a conventional NDIR gas sensor. An NDIR gas sensor 100 is constructed with an infrared light source 120 at the one end of an optical cavity 110 and a photodetector 140 at the other end thereof. Gas enters and exits the inner space of the optical cavity 110 through gas inlet and outlet openings ("GAS IN" and "GAS OUT"). As optical signals emitted from the light source 120 travel through total internal reflection in the optical cavity 110, some of them are absorbed by the gas particles 130 which have entered the optical cavity 110, and some of them reach the photodetector 140.

In the gas sensor having such structure, the optical signal measured by the photodetector 140 is affected depending on the concentration of the gas particles 130 and the length of the optical cavity 110, and accordingly, various studies have been conducted to reduce external loss of an optical signal emitted from a light source and improve contact with gas particles. For example, techniques, such as techniques for minimizing the effects of non-fire alarm-causing substances such as water vapor and dust, improving the internal reflectance to control the loss of optical signals inside an optical cavity, increasing the optical path of the optical signal emitted from the light source, increasing contact between optical signals and gas particles, and the like, are being studied.

SUMMARY

Currently, optical cavity design and manufacturing technologies are being actively researched, but there are still many fundamental limitations with respect to design and implementation in terms of design and process costs, complex processes, and securing physical space of optical cavity required to improve light paths of optical signals. In addition, for the practical application of the gas sensor, gas needs to flow smoothly into an enclosed area such as an optical cavity, which is the space between the light source and the photodetector, and thus, this leads to many constraints, such as additional parts, gas flow control technology, and the like.

Therefore, research should be conducted on gas sensor technology for overcoming limitations in cost, simple structure, optical path of an optical cavity, efficient contact between optical signals and gas particles, etc.

To address the problems discussed above, the disclosure provides a non-dispersive infrared gas sensor technology which detects the concentration of gas with a simple structure and method by manufacturing an optical waveguide with a gas-permeable polymer material instead of a conventional cavity or chamber type. The concentration of a specific gas included in a complex gas can be measured by utilizing the characteristic that a specific gas molecule absorbs an optical signal in a specific wavelength region. Through the present disclosure, it is possible to simply measure the concentration of a specific gas without openings through which gas enters and exits the inside of a conventional optical cavity (or an optical waveguide (tube, chamber, or the like)).

Specifically, a low-cost polymer with gas permeability is manufactured as an optical waveguide serving as a conventional optical cavity, a light source emitting an optical signal is installed at the one end of the optical waveguide, and a photodetector is installed to detect the optical signal at the other end of the optical waveguide, whereby a non-dispersive infrared (NDIR) gas sensor is implemented. In the gas sensor implemented as described above, the optical signal travels through the optical waveguide of gas-permeable polymer by total internal reflection, and in the gas generated in the environment where the optical waveguide is present naturally penetrates the optical waveguide without the use of separate inlet and outlet openings, so that the optical signal and gas particles come into contact with each other within the optical waveguide. Since the optical signal detected by a photodetector at the other end of the optical waveguide after traveling while contacting the gas particles has properties changed according to the concentration of the gas which they have contacted in the optical waveguide, it is possible to measure the concentration of a specific gas from the detected optical signals.

Additionally, by introducing a bending structure into the optical waveguide to control the length of the optical path, physical space limitations of the optical path can be overcome, and the sensitivity of gas detection can be improved by installing an end mirror, designing the geometry of the optical waveguide, introducing traverse hole(s), or the like. Additionally, it is possible to provide a multifunctional gas sensor capable of measuring individual concentrations of complex gas by installing, in front of the photodetector, one or more band pass filters each of which selectively passes a specific wavelength.

A more detailed configuration and operation of the present disclosure will become clearer through specific embodiments described later in conjunction with the drawings.

DETAILED DESCRIPTION

Hereinafter, preferred embodiments of the present disclosure will be described in detail with reference to the accompanying drawings. As used herein, the terms are for the purpose of describing the embodiments of the present disclosure, and are not intended to limit the present disclosure. Herein, terms in the singular form also relate to the plural form unless specifically stated otherwise. As used herein, the terms "comprise", "comprising" or the like is used to specify the presence of stated components, steps, operations, and/or elements, but does not preclude the presence or addition of at least one other component, step, operation, and/or element.

The present disclosure provides a non-dispersive infrared gas sensor technology which simply detects the concentration of gas by the use of a gas-permeable polymer based optical waveguide, instead of using the cavity or chamber.

A polymer may be defined as a material having a network structure in which molecular chain monomers, each composed of several atoms, are repeatedly bonded. Here, free volume (FV) having a certain space presents between the network structures of molecular chain monomers, and the FV is determined according to cohesiveness between molecules and/or between monomer chains, chain structure, and the like. The FV generally presents out of order with a diameter of approximately 0.1 nm to 1.5 nm. The FV inevitably and naturally occurs inside the polymer material, and depending on the diameter of the FV, a specific gas particle has a characteristic of penetrating/passing through the polymer membrane through the free volume.

For example, PDMS (polydimethylsiloxane) as a representative polymer material has been reported as a material having a disordered free volume with a diameter of approximately 0.4 nm to 0.8 nm. When a gas particle having a smaller molecular diameter than that of the free volume contacts the polymer film having the free volume, the gas particle moves by diffusion reaction through the free volume.

In addition, PDMS is a material having elasticity and excellent light transmission characteristics, and is an object of study as a material for an optical waveguide which is a transmission path of an optical signal. In particular, carbon monoxide (CO) and carbon dioxide (CO2), which are inevitably generated in the event of a fire, are reported to have a molecular diameter of less than 0.4 nm, so they penetrate the cross-sectional area of the PDMS film, and at this time, they can come into contact with the optical signal traveling by total internal reflection (TIR) inside the PDMS film. In this regard, when an optical signal starting from a light source (which can emit multi-wavelength optical signals) travels toward a photodetector by total reflection inside the PDMS polymer, and if it passes through a band pass filter before reaching the photodetector, the band pass filter selectively passing only an optical signal of a specific wavelength, an NDIR gas sensor can be realized which can selectively measure the concentration of specific gas particles in complex gas. The optical signal reaching the light receiving sensor, which is the photodetector, is converted into an electrical signal, and the resulting value is output or displayed through an electrical signal processing module which analyzes and calculates the resulting value.

The light source can be realized with LD (laser diode) or LED, but it is possible to emit optical signals having various wavelength bands even with an incandescent light source. Additionally, if N band pass filters are utilized, it is possible to implement a multifunctional gas sensor which measures N−1 gas particle concentrations (one band pass filter is used as a reference filter).

The present disclosure provides an efficient multifunctional NDIR gas sensor having a simple structure without an optical cavity (or optical waveguide or chamber), which is a physical space for maintaining a gas environment, by the use of an optical waveguide made of a gas-permeable polymer material (e.g., PDMS) as described above.

Hereinafter, various embodiments of a non-dispersive infrared gas sensor according to the present disclosure will be described in detail. The present disclosure can be freely realized as in various embodiments of FIGS. 2A to 5 depending on the design and structure of an optical waveguide, and purpose. In an embodiment of a non-dispersive infrared gas sensor to be described below, it is illustrated that PDMS among polymer materials is used as the material of the optical waveguide.

Figure 2A:
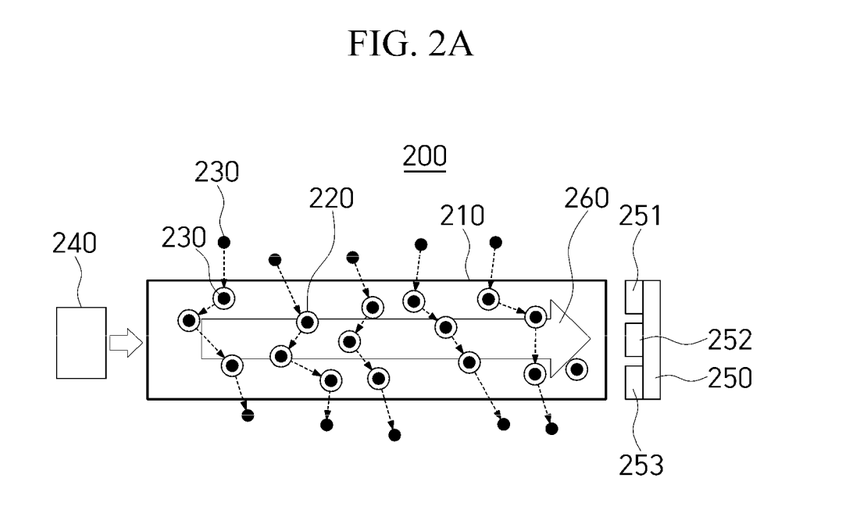
FIGS. 2A and 2B are configuration diagrams of an NDIR gas sensor using a gas-permeable polymer based optical waveguide according to an embodiment of the present disclosure.
Figure 2B:
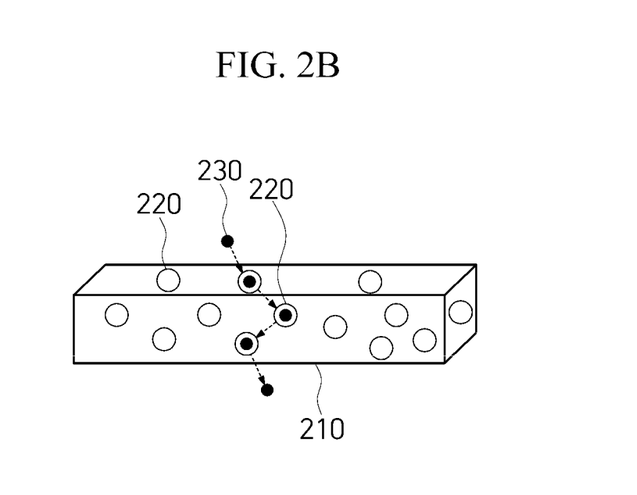

FIGS. 2A and 2B schematically show the structure of a non-dispersive infrared (NDIR) gas sensor according to a representative embodiment of the present disclosure, wherein FIG. 2A is a top view of the NDIR gas sensor, and FIG. 2B shows a three-dimensional view of only the optical waveguide of the NDIR gas sensor.

The non-dispersive infrared gas sensor 200 according to this representative embodiment basically includes a light source 240 capable of emitting an optical signal, an optical waveguide 210 made of a gas-permeable polymer (e.g., PDMS) having a free volume (FV) 220, and a light receiving sensor 250 which is a photodetector for detecting an optical signal coming along the optical waveguide 210.

Further, the gas sensor 200 may additionally include a plurality of band pass filters 251, 252, and 253 each of which selectively passes a specific wavelength. In this regard, the light source 240 needs to be capable of emitting multi-wavelength optical signals, and the band pass filters 251, 252, and 253 may be each coupled to the light receiving sensor 250. The light receiving sensor 250 is individually connected to each of the band pass filters 251, 252 and 253, and independently detects an optical signal 260 which has passed through each of the band pass filters 251, 252 and 253.

Gas particles 230 such as carbon monoxide (CO) or carbon dioxide (CO2), which are inevitably generated in the event of a fire, are reported to have a diameter equal to or less than that of the free volume (FV) 220 of the optical waveguide 210, and thus the gas particles 230 penetrate the optical waveguide 210 through the free volume (FV) 220 inside the optical waveguide 210 located in the gas environment. In addition, as the optical signals 260 emitted from the light source 240 travel to the photodetector by total reflection inside the optical waveguide 210, they contact the gas particles 230 penetrating the optical waveguide 210, pass through the band pass filters 251, 252, and 253, and then are detected by the light receiving sensor 250. The optical signals reaching the light receiving sensor 250 independently output signal values which have passed through of the band pass filters 251, 252, and 253, respectively. Since the detected optical signals 260 have properties which have been changed according to the concentration of the gas which they have contacted, the concentration of a specific gas can be measured from the detected optical signals. In this way, it is possible to realize a gas sensor without cavities, tubes, chambers, or the like, which is a physical space for fluidic movement and retention of the gas particles.

PDMS, which can be used as the material of the optical waveguide 210, can be made of a polymer with elastic properties by mixing a main agent and a curing agent. The PDMS polymer has a refractive index property of 1.40 to 1.45, which may even vary depending on wavelength and the mixing ratio of the main agent and the curing agent, and also has excellent light transmittance, so that it can be used universally as an optical waveguide. PDMS can control properties such as refractive index and free volume according to the mixing ratio of the curing agent. Therefore, by controlling the mixing ratio of the main agent and the curing agent, the sensitivity of the gas sensor can also be adjusted.

When the PDMS optical waveguide 210 is exposed to atmospheric conditions under which the refractive index is 1 (one), it has an optical waveguide property due to air-cladding. However, since the PDMS waveguide 210 has a property of adsorbing fine dust, or the like, it is necessary to protect around an area of the gas sensor including the PDMS waveguide 210 with a fine net, etc., and a portion where an active device and the optical waveguide are connected to each other, such as a connection portion of the light source 240 and the optical waveguide 210, or a connection portion of the optical waveguide 210 and the detector 250, needs to be protected with a connector, or other thing having a darkroom function (not shown).

The PDMS optical waveguide 210 may be manufactured by applying a mixture of the main agent and the curing agent on the surface of a mold with a circular con cave-convex structure therein, and then curing the mixture at a constant temperature (for example, room temperature to 100° C.). Separation from the mold is possible due to a low surface energy and an elastic property. The mold with a concave-convex structure therein may be manufactured by a general-purpose process such as 3D printing, machining, lithography, or the like.

The concentration measurement of a specific gas may be determined by a band pass filter, wherein the gas concentration of CO2 can be measured with a filter that passes infrared light with a central wavelength of 4.2 μm, and the gas concentration of CO can be measured with a filter that passes infrared light with a central wavelength of 4.6 μm. The aforementioned wavelengths are representative absorption wavelengths of CO2 gas and CO gas. However, in addition to the aforementioned representative absorption wavelengths, although the absorption rate is lower compared to them, CO2 gas has absorption characteristics even in infrared lights with central wavelengths of 1.58 μm, 1.59 μm, 2.0 μm, 2.05 μm, 2.68 μm, and 2.77 μm, and CO gas has absorption characteristics even in infrared lights with center wavelengths of 1.57 μm and 2.33 μm. Accordingly, specifications of the light source 240 and the band pass filters 251, 252, and 253 may be changed according to the purpose and use. And, as mentioned above, at least one filter is used as a filter that passes infrared light of a wavelength not having the absorption characteristics of the measurement gas, and that is used as a reference signal to be compared with the measurement result.

Figure 3A:
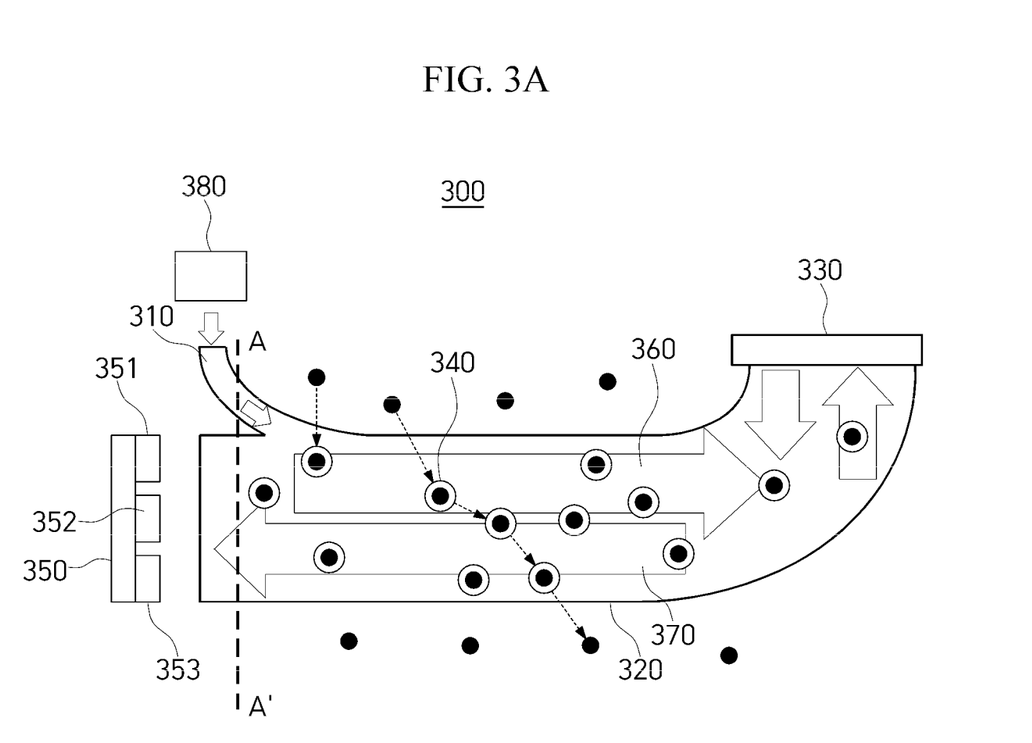
FIGS. 3A and 3B are configuration diagrams of an NDIR gas sensor having a probe-type optical waveguide according to another embodiment of the present disclosure.

FIG. 3A is another embodiment having a structure for improving the sensitivity of the gas sensor of the embodiment of FIG. 2, and shows a probe-type gas sensor in which a light source and a light receiving sensor are aligned at the one end of an optical waveguide. Hereinafter, only differences from the representative embodiment of FIG. 2 will be described without mentioning overlapping contents.

In the structure proposed in the embodiment of FIG. 3A, optical signals emitted from a light source are incident on the one end of an optical waveguide, travel by total reflection inside the optical waveguide, and then are reflected at the other end of the optical waveguide by an optical path changer (material or component) such as a mirror to increase the traveling path of the optical signals, thereby improving the sensitivity of the gas sensor.

More specifically, the optical signals emitted from a light source 380 is incident into a first waveguide 310 and enters a second waveguide 320. The path of the optical signals 360 traveling along the second waveguide 320 is changed by an optical path changer 330 at the other end of the second waveguide. The path-changed optical signals 370 arrive back at a light receiving sensor 350 by total internal reflection, which is coupled with band pass filters 351, 352, and 353 aligned with the light source 380 at one end.

The reason why the sensitivity can be improved in the structure of FIG. 3A is that, based on the Bear-Lambert (BL) theory as described above, the traveling path of the optical signal exponentially affects the measurement value of the optical signal.

Figure 3B:
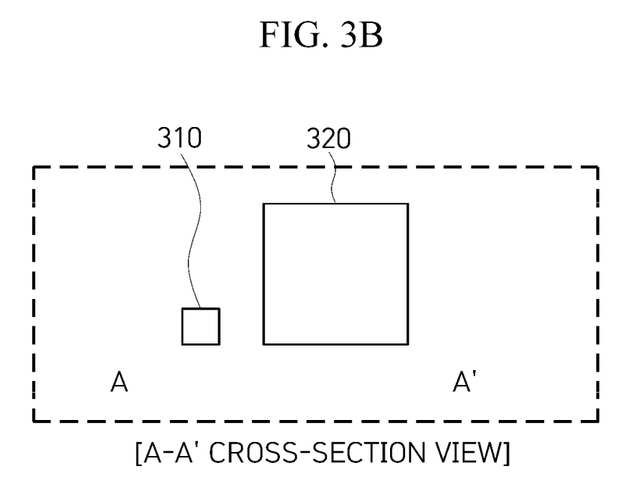

Meanwhile, in order to improve the property that the optical signals 370 whose paths have been changed from the optical path changer 330 at the other end travel to the light receiving sensor 350 at one end, the first waveguide 310 and the second waveguide 320 may be implemented in structures with different dimensions (e.g., cross-sectional area sizes) (see FIG. 3B, which is a cross-sectional view taken along line A-A' shown in the top view of the gas sensor shown in FIG. 3A). Also, the first waveguide 310 and the second waveguide 320 may be implemented such that they gradually contact each other at a contact point at a predetermined angle.

Meanwhile, a bent part is introduced into the structure proposed in FIG. 3A, and this bent part can be derived through the optimization of loss such as a bending loss through simulation in the structural design stage of the optical waveguide. This bent part may be implemented in a structure such as an S-shape, a U-shape, or a Q-shape structure, and accordingly, a functional optical waveguide structures such as a coupler, a splitter, a Mach Zehnder interferometer, or the like can be implemented.

Figure 4:
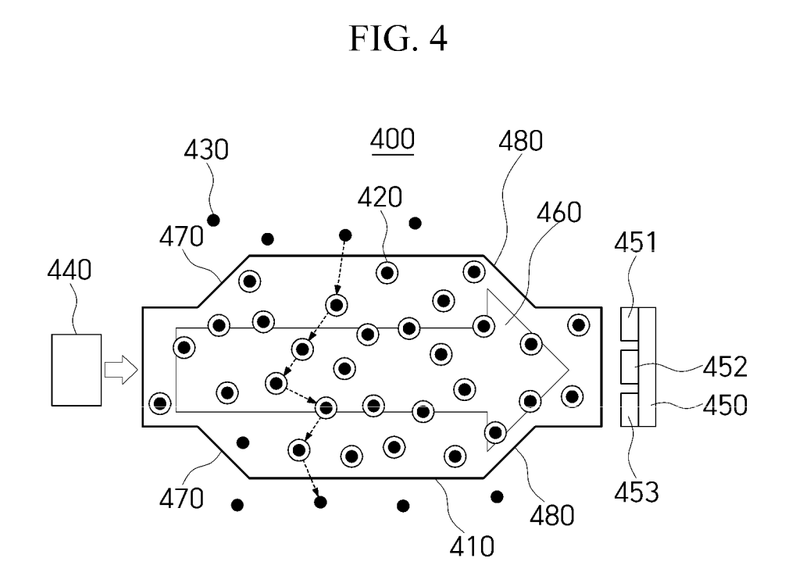
FIG. 4 is a configuration diagram of an NDIR gas sensor which includes an optical waveguide shape introduced thereto so as to improve contact between an optical signal and gas particles according to still another embodiment of the present disclosure.

FIG. 4 shows a structure for improving contact between optical signals 460 emitted from a light source 440 and gas particles 430 in an optical waveguide 410 according to still another embodiment. There is a section having a larger cross-sectional diameter between one end (where the light source 440 is positioned) and the other end (where band pass filters 451, 452, and 453 and light receiving sensor 450 are positioned) of the optical waveguide 410. The boundary portions 470 and 480 between the larger cross-sectional diameter section and the one end and the other end of the optical waveguide 410 have inclined surfaces as shown in FIG. 4, but are not limited to this. According to this structure, when the optical signals 460 starting from the light source 440 travel by total reflection inside the optical waveguide 410, the total internal reflection action surface increases as the shape of the optical waveguide 410 changes. And such increase in the optical path can result in the improvement of contact with the gas particles 430. In addition to this, the penetration distance which the gas particle 430 travels while penetrating the larger cross-sectional diameter section is increased. Accordingly, this structure can relatively shorten the straight line length of the optical waveguide 410, making the integration of the gas sensor possible.

Figure 5:
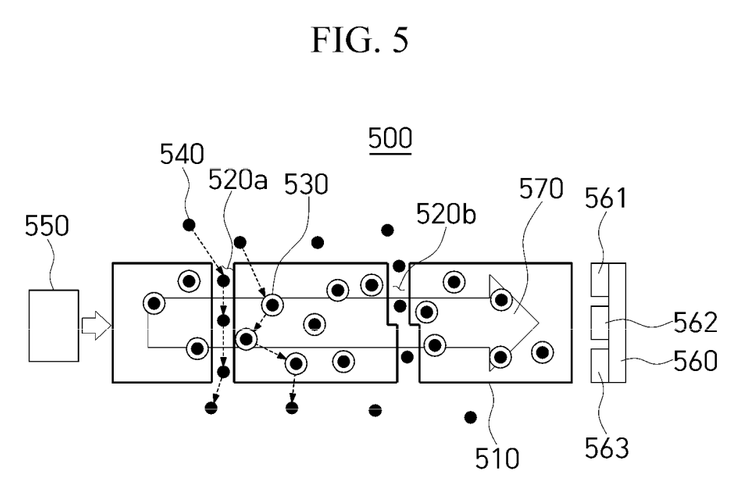
FIG. 5 is a configuration diagram of an NDIR gas sensor in which a traverse hole is formed in an optical waveguide according to yet still another embodiment of the present disclosure.

FIG. 5 schematically shows a structure of a gas sensor 500, as yet still another embodiment of the present disclosure, in which one or more holes 520a and 520b are formed in an optical waveguide 510 such that they traverse the optical waveguide 510. In this embodiment, when gas particles 540 penetrate the optical waveguide 510, a path passing through the traverse holes 520a and 520b and a path passing through a free volume (FV) 530 are provided in combination, so this structure improves the contact between the gas particles 540 and optical signals 570.

The traverse hole 520a formed on the left side of FIG. 5 is formed directly in the traverse direction of the optical waveguide 510, and the traverse hole 520b formed on the right side thereof is formed staggered from the traverse direction of the optical waveguide 510. In addition, although not shown, the cross-sectional shape of the traverse holes 520a and 520b may be a circular shape, a polygonal shape such as a triangle or a quadrangle, or other irregular shape. The various cross-sectional shapes, longitudinal shapes, and diameter sizes of the traverse holes 520a and 520b may be determined based on the behavior of the gas particles 540 penetrating the optical waveguide 510, and the total internal reflection conditions for the optical signals traveling inside the optical waveguide 510. The traverse holes 520a and 520b may be porous passages formed in the traverse direction of the optical waveguide 510, or may simply be pin holes perforated in the traverse direction of the optical waveguide 510.

According to the non-dispersive infrared gas sensor of the present disclosure, it is possible to implement a multifunctional sensor capable of simultaneously measuring the concentrations of specific gases present in complex gas in a simple way, and as it can be manufactured using a simple polymer replicating (molding) process, there is an advantage of being able to implement a gas sensor at low cost. And since it is possible to control the traveling path of the optical signal along which the optical signal comes into contact with the gas, and which is a direct variable in improving the sensitivity of the gas sensor, there is an advantage of being able to secure high sensitivity by being able to solve the limitations of the physical space required for the realization of the conventional optical cavity. Additionally, since an additional environment such as an opening for allowing gas to enter and exit the optical cavity is not required, a simple and efficient gas sensor can be implemented.

In addition, not only the gas generated during a fire, but also the leak of harmful gas and explosive gas at industrial sites are also highly likely to lead to industrial accidents because they are impossible to distinguish with the naked eye and contain colorless and odorless components. Therefore, the highly sensitive multifunctional gas sensor whose reliability is secured by the present disclosure has high effectiveness and ripple effect not only in fire safety, but also in the whole society such as the plant industry, and it can be also used as a safety management product for individuals, households, and other communities in accordance with increasing social requirements such as the increased need for carbon dioxide concentration management in a confined space or the like.

In the above, an embodiment specifically realizing the technical idea of the present disclosure has been described. However, it should be noted that the technical scope of the present disclosure is not limited to the embodiments and drawings described above, but is determined by reasonable interpretation of the claims.

What is claimed is:

1. A non-dispersive infrared gas sensor comprising:
an optical waveguide made of a gas-permeable polymer material that gas can penetrate through free volume in the gas-permeable polymer material;
a light source for emitting an optical signal to the optical waveguide;
a photodetector for detecting the optical signal from the optical waveguide; and
one or more band pass filters in front of the photodetector, which selectively pass optical signals of different wavelengths,
wherein the optical signal travels through the optical waveguide by total internal reflection, and contacts a gas particle penetrating the optical waveguide; and
wherein the one or more band-pass filters comprise a filter that passes infrared light of a wavelength that has no gas absorption characteristics and is usable as a reference filter to be compared with a measurement result.

2. The non-dispersive infrared gas sensor of claim 1, wherein the light source emits optical signals of multiple wavelengths.

3. The non-dispersive infrared gas sensor of claim 1, wherein the light source is located at one end of the optical waveguide, and the photodetector is located at another end of the optical waveguide.

4. The non-dispersive infrared gas sensor of claim 1, further comprising an optical path changer for changing paths of the optical signals emitted from the light source, wherein the light source and the photodetector are aligned at one end of the optical waveguide, and the optical path changer is located at another end of the optical waveguide.

5. The non-dispersive infrared gas sensor of claim 4, wherein the optical waveguide comprises:
a first waveguide into which the optical signal emitted from the light source is incident; and
a second waveguide through which the optical signal incident to the first waveguide travels by total internal reflection.

6. The non-dispersive infrared gas sensor of claim 5, wherein the first waveguide and the second waveguide have different dimensions.

7. The non-dispersive infrared gas sensor of claim 4, wherein the optical waveguide comprises a bent part.

8. The non-dispersive infrared gas sensor of claim 1, wherein the optical waveguide comprises a section between one end and another end of the optical waveguide, which has a larger cross-sectional diameter than the one end and the other end of the optical waveguide.

9. The non-dispersive infrared gas sensor of claim 8, wherein boundary portions between the section having the larger cross-sectional diameter and the one end and the other end of the optical waveguide comprise inclined surfaces.

10. The non-dispersive infrared gas sensor of claim 1, wherein the optical waveguide comprises a traverse hole through which gas particles pass through the optical waveguide.

11. The non-dispersive infrared gas sensor of claim 10, wherein the traverse hole is one of a porous passage and a pin hole.

12. A method for manufacturing a non-dispersive gas sensor, the method comprising:
manufacturing an optical waveguide from a gas-permeable polymer material so that the optical waveguide comprises free volume which gas can penetrate;
installing a light source for emitting an optical signal to the optical waveguide;
installing a photodetector for detecting the optical signal from the optical waveguide;
installing one or more band pass filters to the photodetector, which selectively pass optical signals of different wavelengths;
including in the one or more band-pass filters a filter that passes infrared light of a wavelength that has no gas absorption characteristics; and
using the filter that has no gas absorption characteristics as a reference filter for comparing with a measurement result.

13. The method of claim 12, further comprising installing an optical path changer for changing a path of the optical signal emitted from the light source to the optical waveguide.

14. The method of claim 12, wherein the manufacturing the optical waveguide comprises forming a section between one end and another end of the optical waveguide, which has a larger cross-sectional diameter than the one end and the other end of the optical waveguide.

15. The method of claim 12, wherein the manufacturing the optical waveguide comprises forming a traverse hole through which gas particles pass through the optical waveguide.

* * * * *